United States Patent [19]

Keller et al.

[11] 4,456,702

[45] Jun. 26, 1984

[54] ABATEMENT SCREEN CATALYST

[75] Inventors: Joseph H. Keller, West Chester; Fred G. Baur, Valley Forge, both of Pa.

[73] Assignee: Met Pro Corporation, Harleysville, Pa.

[21] Appl. No.: 399,849

[22] Filed: Jul. 19, 1982

[51] Int. Cl.$^3$ ............... B01J 21/04; B01J 23/56; B01J 23/86; B01J 23/89

[52] U.S. Cl. .................. 502/314; 502/313; 502/325; 502/332; 502/333; 502/334; 502/527

[58] Field of Search ............... 252/477 R; 126/96; 431/329, 347; 502/334, 527, 313, 314, 325, 332, 333

[56] References Cited

U.S. PATENT DOCUMENTS

| | | | |
|---|---|---|---|
| 3,362,783 | 1/1968 | Leak | 252/477 R |
| 4,285,666 | 8/1981 | Burton et al. | 431/347 |
| 4,293,447 | 10/1981 | Inaba et al. | 252/477 R |

FOREIGN PATENT DOCUMENTS

| | | | |
|---|---|---|---|
| 2296143 | 7/1976 | France | 431/329 |
| 55-68519 | 5/1980 | Japan | 126/96 |

*Primary Examiner*—W. J. Shine
*Attorney, Agent, or Firm*—Woodcock, Washburn, Kurtz, Mackiewicz & Norris

[57] ABSTRACT

A catalyst for after market installation into unvented consumer kerosene heaters is provided. In a preferred embodiment plural stainless steel screens each coated with a catalyst material consisting of alumina and a metal from the platinum group or compound thereof is suspended within the kerosene heater. The peripheries of the screens are joined to one another so as to promote fast start up and slow cool down of the catalyst. The catalyst is coated directly on the steel wires of the screen, without intervening ceramic support structure, so as to reduce thermal mass and cost.

17 Claims, 4 Drawing Figures

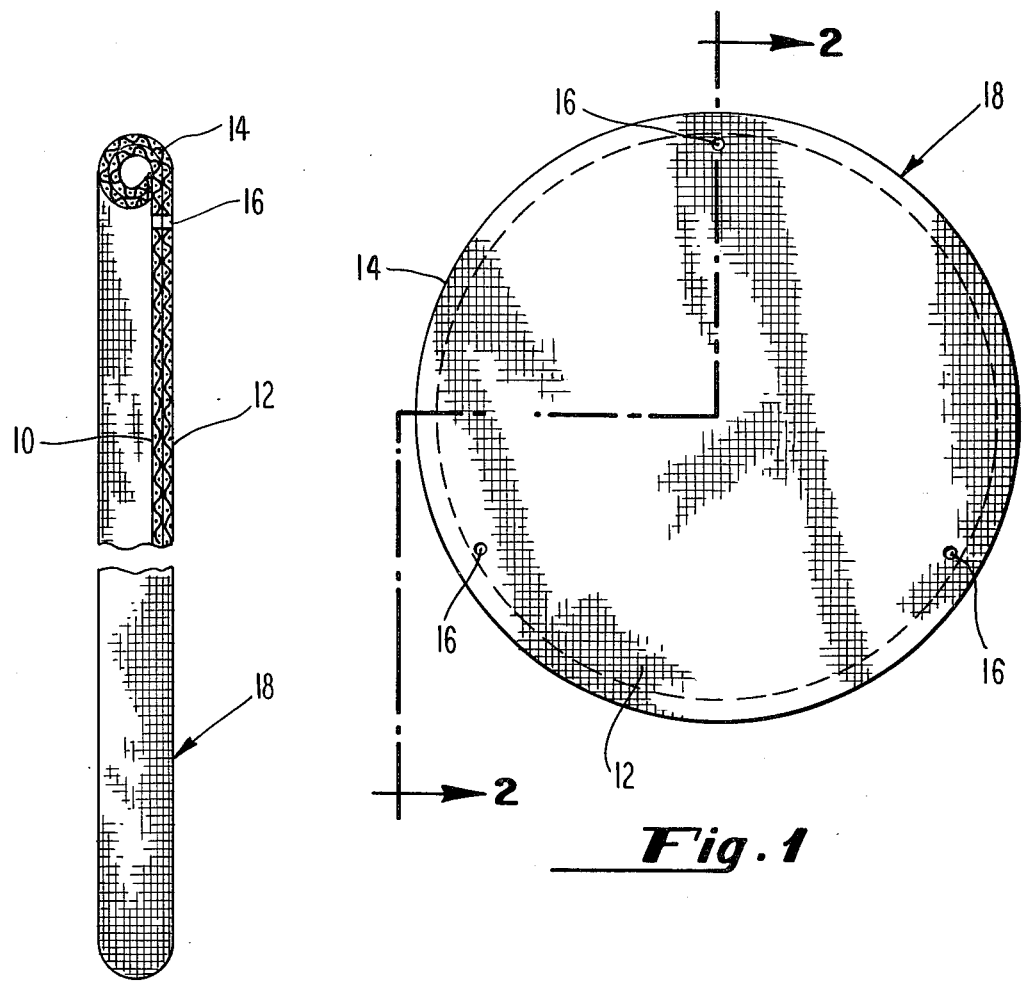
Fig. 1
Fig. 2
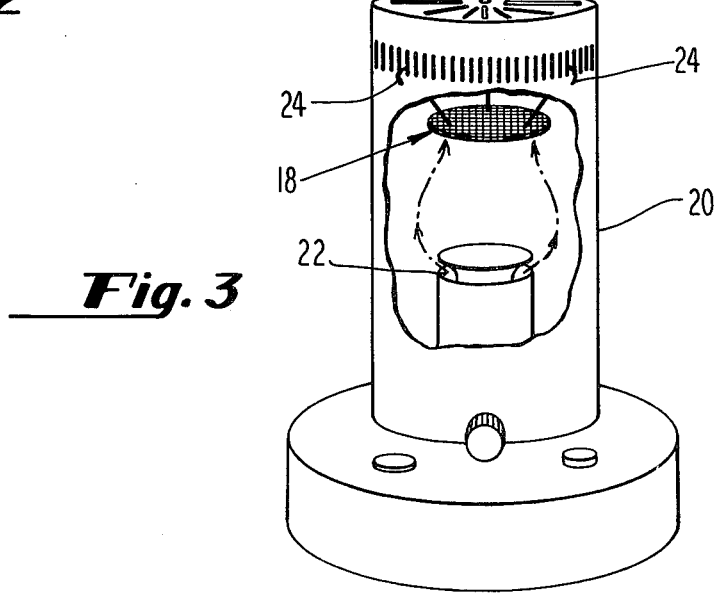
Fig. 3

4,456,702

ABATEMENT SCREEN CATALYST

FIELD OF THE INVENTION

This invention relates to means for reducing odors and noxious gases emitted by domestic unvented kerosene heaters. More particularly, the invention relates to a retro-fittable catalyst structure for ready mounting on kerosene heaters to oxidize carbon monoxide and unburned hydrocarbons to carbon dioxide and water vapor.

BACKGROUND OF THE INVENTION

The last few years have seen a rapid increase in the number of unvented kerosene heaters being used by domestic consumers. Such heaters produce both odors and carbon monoxide. While the kerosene heaters commonly available vary somewhat in outward design their functions are very similar. The kerosene flame is usually on a ceramic wick and is held in a perforated container so as to trap the heat by creating a volume heated in excess of the red heat zone, i.e., over 1000° F. The kerosene burns nearly to completion in such an environment. However, to limit odors and carbon monoxide emissions, the design of the heater must incorporate low thermal inertia so as to heat up and cool down fast. This low thermal inertia design sacrifices control of fuel comsumption because of the constant heated volume. A design compromise thus exists in the potential for generation of appreciable odor and carbon monoxide emission in the interest of better fuel economy. Accordingly, there is a need to abate these contaminants which would otherwise be obnoxious and a hazard to persons in the vicinity of the heater, as well as potentially damaging to fabrics, household goods, and the like.

Several possible solutions to this problem were considered by the applicants herein. A trap or filter in the exhaust gas region would be impractical because a flame restricting pressure drop would be encountered in the unvented heater design. Similarly, use of renewable chemicals such as activated carbon to adsorb odors and carbon monoxide would be self-defeating to the unvented, simple kerosene heater.

Use of a catalyst was therefore suggested, as has been known previously for abatement of odor and carbon monoxide in certain kerosene heaters. However, it was determined that no previously available catalyst satisfied the goals of the invention which were to provide a retro-fittable catalyst adaptable to most, if not all, of the kerosene heaters on the market and simply installable by the consumer himself. Furthermore such a universally designed catalyst structure would desirably be retro-fittable to those few unvented kerosene heaters now sold with catalysts, for replacement of the catalyst when it no longer functions.

It is therefore an object of the invention to provide a retro-fittable catalyst for unvented kerosene heaters which fits both heaters supplied with catalysts and without, which is applicable to both radiant and convection heaters, which can be made at reasonable cost, be suitable for ready installation, and not require any additional energy or chemical reactions for reduction of odor and carbon monoxide.

A further object of the invention is to supply a catalyst as described above, and moreover having low thermal inertia, minimal pressure drop, high abatement activity for both carbon monoxide and odors, and acceptable catalyst life at low cost.

It is important that the catalyst, as noted, be of low cost. Accordingly, while the selection of a alumina/platinum group metals catalyst was a clear selection based on prior art and the prior experience of the applicants, it was necessary to avoid the use of conventional ceramic catalyst supports formed of materials such as cordierite, mullite or alumina, because these all require a container or some other means of protecting the ceramic from breaking, as well as a means of capturing enough heat from the heater to cause the catalytic reaction to take place. Such containers are generally coated metal, e.g., stainless steel, with some insulating filler between the shell of the container and the ceramic catalyst support. Such an abatement package would not be acceptable to the consumer because of high price and high thermal inertia. Such a device would also be difficult to adapt to the numerous models of kerosene heaters now on the market.

Accordingly, it is a further object of the invention to provide a simplified catalyst support structure which is inexpensive and adaptable to various models of kerosene heaters now on the market.

SUMMARY OF THE INVENTION

The above listed needs of the art and objects of the invention are satisfied by the present invention, in which a low thermal inertia screen (e.g., of stainless steel) is used as both container and catalyst support. A mesh screen is employed so as to provide the maximum amount of catalytic surface area without introducing an unacceptable pressure drop. The wire gauge is selected such that the product is rigid within the environment of the unvented kerosene heater, without adding excessive weight or thermal inertia. In a preferred embodiment, the screen is formed into a pair of opposing screen faces with generally enclosed peripheries so as to contain the heat and gases generated, to decrease heat-up time and enhance catalytic activity. While the amount of screen and catalyst used and their relative shape is such that the metal screen support cools as rapidly as the unvented kerosene heater, thus avoiding the creation of additional heater fire hazard, the enclosed periphery of the opposed screens retains heat after the remainder of the heater is cooled down, so as to prolong the catalytic activity beyond the time the kerosene flame is extinguished. The screen supports an adherent coating of an alumina/platinum group metals catalyst.

BRIEF DESCRIPTION OF THE DRAWINGS

The invention will be better understood if reference is made to the accompanying drawings, in which:

FIG. 1 shows the general shape of the screen which is later coated with the catalytic material;

FIG. 2 is a cross-sectional view taken along line 2—2 of FIG. 1;

FIG. 3 is a schematic view showing how the catalyst depicted in FIGS. 1 and 2 can be attached to an unvented kerosene heater.

DESCRIPTION OF THE PREFERRED EMBODIMENTS

Figure 5:
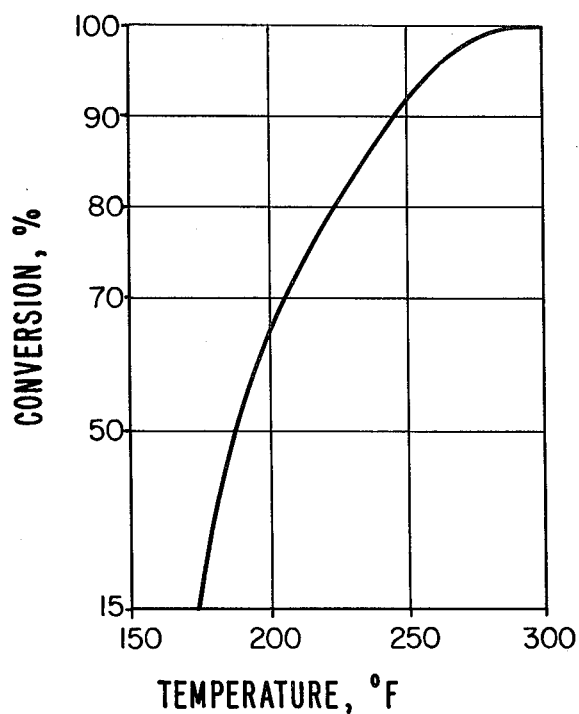
FIGS. 4 and 5 are graphs showing the removal of carbon monoxide and hydrocarbons, respectively, as a function of influent temperature.

It will be understood that the amount of catalyst required in any given system depends on the design gas hourly space velocity (GHSV) value, which is a general measure of the amount of flow. THe facial area over typical kerosene flames depends on the wick design. The applicants' experience indicates that in general a six inch diameter open screen surface is required for presently available commercial unvented kerosene heaters and a catalyst volume equivalent to a 10,000 to 60,000 GHSV is necessary. Multiple layers 10 and 12 of metal screen, as shown in FIGS. 1 and 2, may be used to achieve these results.

Given two or more opposed screens 10 and 12 coated with catalysts, further improvements can be achieved by enclosing the periphery of the opposed screens 10 and 12 to contain needed reaction heat and trap vapors for abatement. The rim 14 may hold the two or more screens 10 and 12 or be integral therewith. In the preferred embodiment shown in FIGS. 1 and 2, the peripheral rim 14 is formed by a roll composed of the cut edge of the screens. This is preferable as a neat, simple solution, because the entire assembly 18 can thereafter be coated with catalyst material, and because no constraint from the standpoint of universal use is involed. FIG. 1 shows the general configuration of the two screens while FIG. 2, a cross-section taken along line 2—2 of FIG. 1 shows how the cut edges of the screens 10 and 12 may be rolled up to bind the two screens 10 and 12 together to provide a neat edge 14 which will not have loose ends to cut the consumer upon installing the catalyst screen in his kerosene heater. Holes 16 are provided through which support wires made of the same material as the screen, typically of stainless steel for resistance to the high temperature reactions undergone by the catalyst, can be passed to suspend the assembly 18 in the consumer's kerosene heater.

After forming the assembly 18 it can be coated with catalyst by first dipping it in a wash coat comprising an alumina slurry, or a similar adherent, non-metallic intermediary. This is then baked to dry it. Next, the screen is dipped in a slurry comprising the catalytic material. Although either base or precious metal catalysts can be used in this application, it has been found preferable that a platinum group material comprise the catalyst for reasons of catalyst performance, projected life and cost effectiveness over the life cycle. One or more elements from the platinum group including palladium, ruthenium and rhodium may be profitably used; compounds of these and mixtures thereof are also possibilites.

FIG. 3 shows schematically how the catalyst and support structure 18 may be attached to a typical convection kerosene heater 20 by a number of wires 24. It is a simple matter for the consumer to suspend the coated support structure 18 above the wick 22 of the heater. It has been found typically with convection heaters as shown in phantom in FIG. 3, the distance from the wick 22 to the catalyst assembly 18 should be between six and eight inches whereas with radiant or "closed flame" heaters, a distance of three to four inches is generally better.

EXAMPLE 1

A type 304 stainless steel screen composed of 20 mesh, 0.016 inch diameter wire was coated with an alumina/platinum group metals catalyst as discussed generally above. The screen supporting the catalyst was cut and its layers were composed so as to have a GHSV of 10,000 In a laboratory reactor system having a test stream containing 1150 parts per million kerosene and air. Results are given in FIG. 5. Clearly the higher the influent temperature of the gas stream, the better the oxidation of the hydrocarbons to water.

Figure 4:
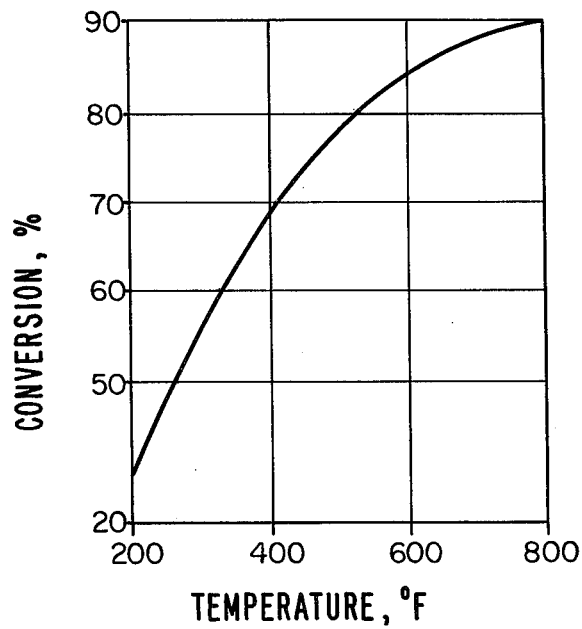

FIG. 4 shows the results of a similar laboratory test performed with an influent stream of 260 parts per million carbon monoxide and air. Again, it is clear that increased influent temperatures result in better oxidation of the carbon monoxide to harmless carbon dioxide.

These tests clearly show the desirability of the low thermal inertia provided by the catalyst assembly of the invention, as this permits high catalyst temperatures to be reached quickly.

EXAMPLE 2

Two pieces of type 304 stainless steel screen approximately six inches in diameter were cut and shaped so that a clean rolled edge of approximately 3/16 inch diameter was achieved around the circumference of the unit. The unit was coated and catalyzed as in Example 1 above and tested with actual unvented kerosene heaters. The screen catalyst was held by three wires spaced as intervals of 120° and attached to vent holes of the heater tested. Inlet carbon monoxide was adjusted by varying the position of the heater wick to cause poor burning and carbon monoxide emission. Table 1 shows the results of the test.

TABLE 1

| Heater | Carbon Monoxide, Parts Per Million | | Temperature °F. | GHSV* |
| --- | --- | --- | --- | --- |
| | Inlet | Outlet | | |
| Corona DK22 | 50 | less than 5 | 800 | 56,000 |
| Sanyo DHR-G28HS | 600 | less than 10 | 1000 | 23,000 |

*GHSV calculated based upon the kerosene burning rate given by the heater manufacturer.

It will be appreciated that there has been described a catalyst apparatus for after market installation to a wide variety of consumer unvented kerosene heaters which will result in reduced odor and carbon monoxide emissions. By providing a pair of closely opposed faces of a stainless steel material for coating with catalyst, the thermal mass of the catalytic converter is greatly reduced so that it reaches a high operating temperature very quickly. This is advantageous as evidenced by FIGS. 4 and 5. Similarly, the provision of the opposed faces of the two or more catalyst coated screens and the enclosing peripheral ring allows the combustion of the catalytic reaction to continue at a high temperature even after shutting down of the heater, thus insuring that any remaining unburned hydrocarbons and carbon monoxide are catalyzed to their oxidized states even after the heater is turned off and the temperature begins to drop. Those skilled in the prior art will furthermore recognize that while a preferred embodiment of the invention has been described above, other embodiments are possible and the appended claims are to be interpreted to include such modifications.

We claim:

1. A catalyst assembly for reducing the odors and atmospheric contaminants emitted by nonvented kerosene heaters comprising:

a metallic screen having a catalytic material directly coated thereon substantially covering its surface, and wire support means for direct attachment of said coated screen to such heaters for suspending the coated screen within such kerosene heaters for catalytic combustion of hydrocarbons and carbon monoxide.

2. The catalyst assembly of claim 1 wherein plural layers of screen coated with catalytic material are provided and are coextensive in shape.

3. The catalyst assembly of claim 2 wherein said plural layers are joined to one another around their periphery whereby catalytic activity is enhanced.

4. The catalyst assembly of claim 3 wherein said peripheral joining is accomplished by rolling up the peripheries of the two or more layers of screen.

5. The catalyst assembly of claim 1 wherein said wire support means provided for suspending said coated screen above the combustion area in such a kerosene heater are formed of materials compatible with said screen and resistant to combustion temperatures.

6. The catalyst assembly of claim 1 wherein said catalytic material comprises an alumina/platinum group composite catalyst material.

7. The catalyst assembly of claim 1 wherein said screen is a type 304 stainless steel wire mesh screen.

8. A catalyst assembly for after market installation in an unvented kerosene heater, consisting of:
(a) a stainless steel wire mesh support and substrate structure;
(b) a catalytic coating applied directly to said stainless steel mesh structure; and
(c) stainless steel support wire means affixed to said coated wire mesh support for direct attachment to said kerosene heater to suspend said coated wire mesh support above the combustion zone in said kerosene heater.

9. The catalyst assembly of claim 8 wherein plural screens substantially congruent in outline are provided.

10. The catalyst assembly of claim 9 wherein the peripheries of said screens are joined to one another so as to promote catalytic activity between said screens.

11. The catalyst assembly of claim 10 wherein the peripheries are joined by rolling up the edges of said screens to create a rounded periphery.

12. The catalyst assembly of of claim 8 wherein said catalytic coating comprises materials selected from the group consisting of platinum group metals and alumina/platinum group metal composites.

13. A catalyst assembly for reduction of odor and noxious gases emitted from nonvented kerosene heaters comprising:
a metallic screen support structure having a catalytic material directly coated thereon and substantially covering its surface for suspension within said kerosene heaters for catalytic combustion of hydrocarbons and carbon monoxide, wherein plural layers of metallic screen support structure coated with catalytic material are provided and are coextensive in shape; and
wire means for direct attachment of said coated screen support to said kerosene heaters for suspending the catalytic assembly above the combustion area of said kerosene heaters.

14. The assembly of claim 13 wherein said plural layers are joined to one another around the periphery of the catalyst whereby catalytic activity is enhanced.

15. The assembly of claim 14 wherein said peripheral joining is accomplished by rolling up the peripheries of the two or more layers of screen.

16. The assembly of claim 13 wherein said wire means being formed of materials compatible with said screen and resistant to combustion temperatures.

17. The assembly of claim 13 wherein said catalytic material comprises an alumina/platinum group catalytic material.

* * * * *

UNITED STATES PATENT AND TRADEMARK OFFICE
CERTIFICATE OF CORRECTION

PATENT NO. :   4,456,702
DATED      :   June 26, 1984
INVENTOR(S) :  Joseph H. Keller and Fred G. Baur It is certified that error appears in the above-identified patent and that said Letters Patent is hereby corrected as shown below:

Column 1, line 29:   "comsumption" should read --consumption--.

Column 3, line 2:    "THe" should read --the--.

Column 3, line 22:   "involed" should read --involved--.

Column 3, line 66:   "In" should read --in--.

Column 4, line 22:   "as" should read --at--.

Signed and Sealed this

Twelfth Day of February 1985

[SEAL]

Attest:

DONALD J. QUIGG

Attesting Officer    Acting Commissioner of Patents and Trademarks